(12) United States Patent
Metzger

(10) Patent No.: US 10,630,092 B2
(45) Date of Patent: Apr. 21, 2020

(54) PROTECTION CIRCUIT FOR A CHARGING APPARATUS

(71) Applicant: Dr. Ing. h.c. F. Porsche Aktiengesellschaft, Stuttgart (DE)

(72) Inventor: Christian Metzger, Tamm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/102,785

(22) Filed: Aug. 14, 2018

(65) Prior Publication Data

US 2019/0089173 A1 Mar. 21, 2019

(30) Foreign Application Priority Data

Sep. 15, 2017 (DE) .................. 10 2017 121 441

(51) Int. Cl.
*H02J 7/00* (2006.01)
*H02J 7/34* (2006.01)

(52) U.S. Cl.
CPC .......... *H02J 7/0034* (2013.01); *H02J 7/0042* (2013.01); *H02J 7/0068* (2013.01); *H02J 7/342* (2020.01)

(58) Field of Classification Search
CPC .................................................. H02J 7/0034
USPC ....................................................... 320/107
See application file for complete search history.

(56) References Cited

U.S. PATENT DOCUMENTS

2005/0110467 A1   5/2005  Thomason
2009/0295299 A1*  12/2009 Sowa ................ H05B 41/2806
                                                           315/209 R
2011/0273139 A1* 11/2011  Hofheinz ............. B60L 3/0023
                                                           320/109
2014/0029146 A1*  1/2014  Pavlin .................. H01L 27/0248
                                                           361/84
2015/0137740 A1*  5/2015  Allos .................... H02J 7/0054
                                                           320/107
2016/0049819 A1   2/2016  Butler et al.

FOREIGN PATENT DOCUMENTS

DE        102013221590 A1    4/2015
DE        102016012375 A1    4/2017

OTHER PUBLICATIONS

German Office Action for German Applicatior1 No. 10 2017 121 441.0, dated Aug. 13, 2018, with translation, 7 pages.

* cited by examiner

*Primary Examiner* — Jerry D Robbins
(74) *Attorney, Agent, or Firm* — RatnerPrestia

(57) ABSTRACT

A protective circuit for a DC voltage charging apparatus has a first input, a first output, a second input, a second output, a controllable first switch, a controllable second switch and a first circuit. The first output can be electrically connected to the first input by the controllable first switch and the second output can be electrically connected to the second input by the controllable second switch. The first circuit is electrically connected to the first output and to the second output and said first circuit has a voltmeter, which is designed to identify a voltage value that characterizes the sign of the voltage between the first output and the second output. The first circuit is designed to make it possible to actuate the first switch and the second switch depending on the voltage value.

6 Claims, 1 Drawing Sheet

US 10,630,092 B2

PROTECTION CIRCUIT FOR A CHARGING APPARATUS

CROSS-REFERENCE TO RELATED APPLICATION

This application claims priority to German Patent application No. DE 10 2017 121 441.0, filed Sep. 15, 2017, which is incorporated by reference herein in its entirety.

FIELD OF THE INVENTION

The invention relates to a protective circuit for a DC voltage charging apparatus.

BACKGROUND OF THE INVENTION

During a charging process of a rechargeable battery, for example a traction battery for a vehicle having an electric drive, in the event of polarity reversal, a short circuit and damage to the battery or to the charging device can occur.

US 2005/0110467 A1, which is incorporated by reference herein, shows a charging device for a motor vehicle that has polarity detection means and overcurrent protection means. Depending on the polarity, the battery that is to be charged is connected to a direct current source by means of a bridge circuit with the correct polarity.

US 2015/0137740 A1, which is incorporated by reference herein, shows a mobile charging system having a polarity-reversal protection circuit, which checks the voltage at the battery by means of a comparator and, in the event of polarity reversal, closes a relay in order to activate a red light.

US 2016/0049819 A1, which is incorporated by reference herein, shows a battery charging device having means for checking for polarity reversal, wherein, in the event of polarity reversal, a warning signal is emitted.

Solutions are known in which a fuse and a diode having a flow direction from the negative branch to the positive branch are provided in the charging apparatus. In the case of polarity reversal, a large current flows via the diode and the fuse and the fuse breaks or blows. The power loss produced by the electrical resistance of the fuse during normal operation is disadvantageous.

SUMMARY OF THE INVENTION

It is therefore an object of the invention to provide a new protective circuit for a DC voltage charging apparatus.

The object is achieved by the subject matter of claim 1.

Switching the first switch and the second switch depending on sign of the voltage between the first output and the second output makes it possible to reliably prevent a short circuit.

According to a preferred embodiment, the first switch and the second switch are designed as contactors. Contactors make it possible to switch a high power with very little power loss and make it possible to design the protective circuit without semiconductor switches in the power branches.

According to a preferred embodiment, a precharging circuit is connected in parallel with the first switch. A precharging circuit makes it possible to balance the voltage between the charging device and, for example, the traction battery connected thereto and hence to operate the first switch without arcing.

According to a preferred embodiment, when the voltage between the first output and the second output has a prescribed sign, the first switch is closed only after a prescribed period in order to make it possible to balance the potential between the first input and the first output. This makes reliable functioning of the precharging circuit possible.

According to a preferred embodiment, the first switch is switched on only when the potential difference between the first output and the first input is lower than a prescribed potential difference. This reliably prevents a large current from flowing when the first switch is switched on, which can lead to damage to the first switch or other components.

According to a preferred embodiment, the voltmeter has a measuring resistor and the voltmeter is designed to identify the voltage value by measuring the voltage dropped across the measuring resistor. This makes it possible to reliably measure the voltage.

According to a preferred embodiment, the first input and the second input are connected to a direct current source. The protective circuit can protect the direct current source as a result.

According to a preferred embodiment, the first output and the second output are electrically connected to a charging column for a vehicle. Vehicles require very high currents and/or voltages for rapid charging and the protective circuit is particularly advantageous for this.

According to a preferred embodiment, the charging column has a terminal for a battery that is to be charged. This simplifies the connection of the battery.

BRIEF DESCRIPTION OF THE FIGURES

Further details and advantageous refinements of the invention will emerge from the exemplary embodiments described below and illustrated in the drawings, which embodiments should in no way be understood as restricting the invention, and also from the dependent claims. In the figures:

DETAILED DESCRIPTION OF THE INVENTION

Figure 1:
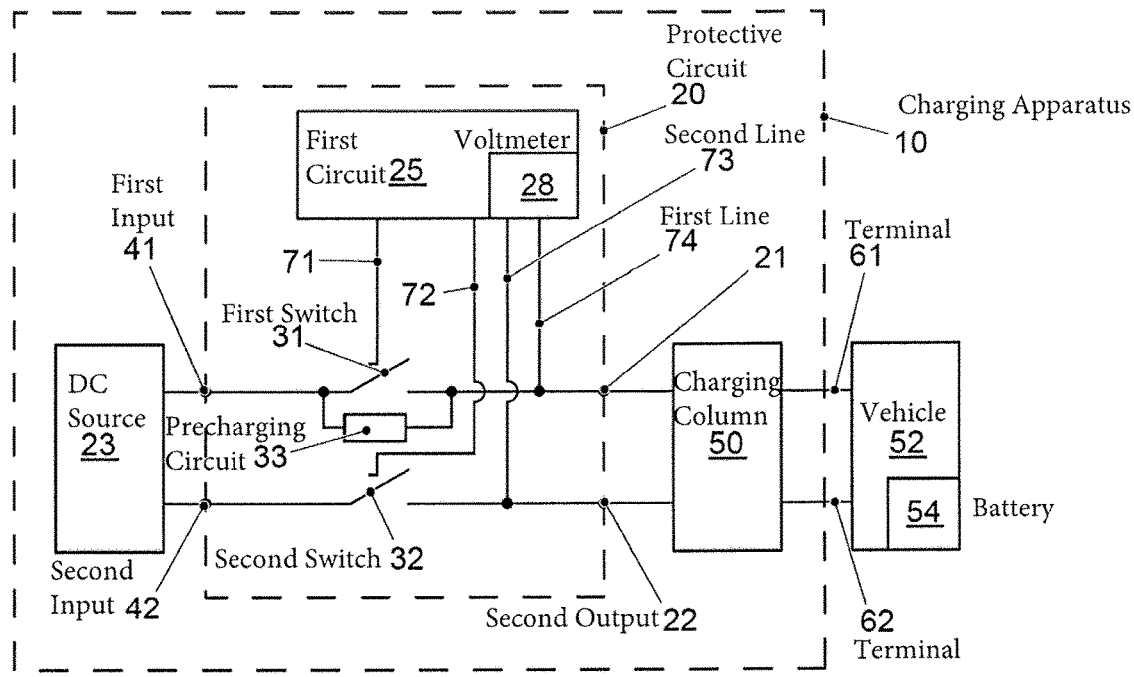
FIG. 1 shows a schematic circuit diagram of a charging apparatus and a vehicle connected thereto.

FIG. 1 shows a charging apparatus 10 having a terminal 61 and a terminal 62, which are used to electrically connect a vehicle 52 having a battery 54 that is to be charged.

The charging apparatus 10 has a direct current source 23, a protective circuit 20 and, by way of example, a charging column 50.

The protective circuit 20 has a first input 41, a first output 21, a second input 42, a second output 22, a controllable first switch 31, a controllable second switch 32 and a first circuit 25. The first output 21 can be electrically connected to the first input 41 by means of the controllable first switch 31 and the second output 22 can be electrically connected to the second input 42 by means of the controllable second switch 32. The first circuit 25 is electrically connected to the first output 21 via a line 74 and to the second output 22 via a line 73.

The first circuit 25 has a voltmeter 28, which is designed to identify a voltage value that characterizes the sign of the voltage between the first output 21 and the second output 22.

For this purpose, for example, the voltage can be measured with the sign and then the sign can be evaluated.

The first circuit 25 is designed to make it possible to actuate the itch 31 an second switch 32 depending on the voltage value.

The first switch 31 and the second switch 32 are preferably designed as contactors, but power semiconductors, for example, or other switches are also possible.

A precharging circuit 33 is preferably connected in parallel with the first switch 31. Precharging circuits serve to carry out potential balancing. For this purpose, a current can flow between the first output 21 and the first input 41 via the precharging circuit 33, and, as a result thereof, the potential at the first output 21 and at the first input 41 is equal or at least almost equal. This is advantageous to prevent or at least reduce arcing when the first switch 31 is closed. The first input 41 and the second input 42 are connected to the direct current source 23, wherein the connection is preferably such that the potential at the first input 41 is greater than the potential at the second input 42. The first output 21 and the second output 22 are connected to the charging column 50 and the charging column 50 is connected to the vehicle 52 via the lines 61, 62.

Mode of Operation

In the basic state, the first switch 31 and the second switch 32 are not switched on. When the battery 54 is connected to the charging apparatus 10, it induces a voltage between the first output 21 and the second output 22. No current flows via the first switch 31 and the second switch 32 and the voltage can be measured by means of the voltmeter 28. When the voltage value identified here corresponds to a voltage that arises upon correct connection of the battery 54, the first circuit 25 can switch on the first switch 31 and the second switch 32 and the battery 54 can be charged.

In contrast, when the voltage value signals a polarity reversal of the battery 54, that is to say, for example, when the potential at the second output 22 is greater than the potential at the first output 21, the first circuit 25 does not switch on the first switch 31 and the second switch 32 and the incorrectly connected battery 54 is, not charged. This can prevent destruction of the battery 54 or the charging apparatus 10.

When the voltage between the first output 21 and the second output 22 has a prescribed sign (polarity is not reversed), the first switch 31 is preferably closed only after a prescribed period in order to make it possible to balance the potential between the first input 41 and the first output 21 beforehand by way of the precharging circuit 33. The prescribed period can in this case be fixedly prescribed, for example, when the time for the potential balancing can be estimated, or the potential difference between the first output 21 and the first input 41 can be measured, and the first switch 31 can be switched on only when the potential difference is lower than a prescribed potential difference.

The voltmeter 28 can also have a measuring resistor, which makes it possible to measure the voltage generated by the current through the measuring resistor and hence to measure the current direction and the voltage with the sign.

The protective circuit 20 makes it possible to reliably protect the charging apparatus 10 and the battery 54 from polarity reversal and no additional fuses or other switching elements are required in the power path. The use of contactors as first switch 31 and second switch 32 makes a protective circuit without additional semiconductor switches in the power path possible. As a result thereof, a very low power loss can be achieved by the protective circuit 20.

The protective circuit 20 shown can be used, for example, for a charging mode according to the standard IEC 61851-23, mode 4, section CC.

Figure 2:
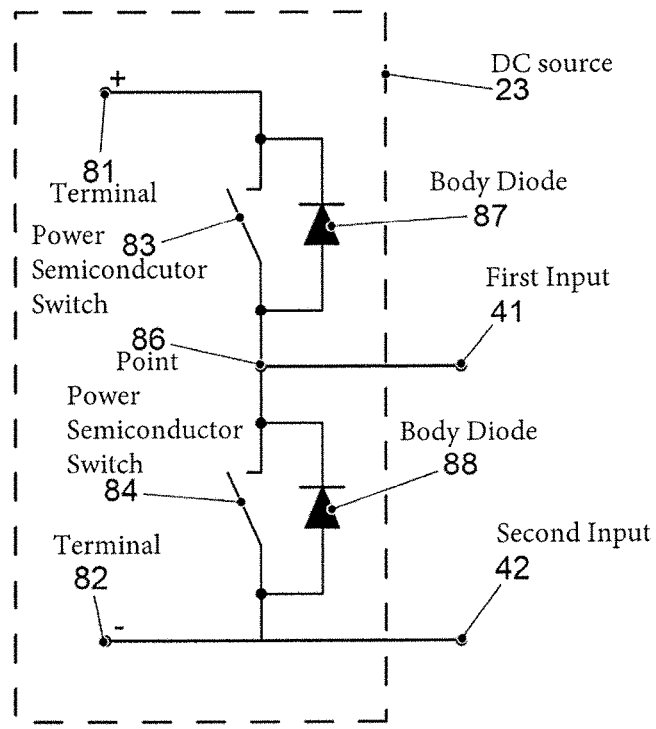
FIG. 2 shows a schematic circuit diagram of a direct current source for the charging apparatus from FIG. 1 in the form of a half-bridge.

FIG. 2 shows an exemplary embodiment of the direct current source 23 having a DC/DC stage, which is also referred to as a DC/DC converter or DC voltage converter. Only one half-bridge, which is a constituent part of the DC/DC stage, is shown. A terminal 81 and a terminal 82 are provided and can be connected to a high-voltage direct current source. The terminal 81 is connected to a point 86 via a power semiconductor switch 83 and the point 86 is connected to the terminal 82 via a power semiconductor switch 84. The point 86 is connected to the first input 41 of the protective circuit 20 and the terminal 82 is connected to the second input 42 of the protective circuit 20. Upon observation of the half-bridge of the direct current source 23, the terminals 81, 82 therefore represent the inputs and the points 41, 42 represent the outputs. A body diode 87 and 88, respectively, are in each case connected in parallel with the power semiconductor switches 83 and 84. The body diode 87 is connected in the forward direction from the point 86 to the terminal 81 and the body diode 88 is connected in the forward direction from the terminal 82 to the point 86. The voltage between the first input 41 and the second input 42 can be influenced by preferably alternately clocked actuation of the power semiconductor switches 83, 84. In the case of such a direct current source 23, when the polarity of the battery 54 is reversed, a short-circuiting current can flow from the battery via the body diode 88 back to the battery and this can lead to destruction of the charging apparatus 10 or the battery 54. The protective circuit 20 can reliably preclude such a malfunction.

Various variations and modifications are of course possible within the scope of the present invention.

What is claimed is:

1. A direct current (DC) voltage charging apparatus, comprising:
   a DC source including: (i) a high-voltage DC source, and (ii) a DC/DC converter, the DC/DC converter including:
      a half-bridge including an upper leg and lower leg, wherein:
         the upper leg includes a first power semiconductor switch and a first body diode connected in parallel between a first terminal to a point between the upper leg and the lower leg,
         the first terminal is a connected the high-voltage DC source and the point via the first power semiconductor switch,
         the lower leg includes a second power semiconductor switch and a second body diode connected in parallel between a second terminal and the point, and
         the second terminal is a connected the high-voltage DC source and the point via the second power semiconductor switch,
         the first body diode is connected in a forward direction from the point to the first terminal,
         the second body diode is connected in the forward direction from the second terminal to the point; and
   a protective circuit comprising:
      a first input connected to the point of the DC/DC converter between the upper leg and the lower leg, a first output connected to a charging column via a first line,
a second input connected to the lower leg of the DC/DC converter, wherein under normal polarity a first input electrical potential at the first input is greater than a second input electrical potential at the second input,
a second output connected to the charging column via a second line,
a controllable first switch configured to electrically connect the first output to the first input,
a controllable second switch configured to electrically connect the second output to the second input,
a first circuit electrically connected to the first output and to the second output, and
a precharging circuit connected in parallel with the first circuit to flow current between the first output and the first input to reduce arcing when the first switch is on (closed), wherein:
the first circuit includes a voltmeter to measure a voltage value induced between the first output and the second output when a battery of a vehicle is connected to the charging column and configured to identify a sign of the voltage value that signals normal polarity and reverse polarity of the voltage value,
if the identified sign of the voltage value signals reverse polarity of the battery arising upon incorrect connection of the battery to the charging column such that a second output electrical potential at the second output is greater than a first output electrical potential of the first output, the first circuit switches off the first switch and switches off the second switch to stop charging of the battery, and
if the identified sign of the voltage value signals normal polarity arising upon correction connection of the battery to the charging column: (i) the second switch is switched on, and (ii) the precharging circuit balances electrical potential between the first input and the first output for a prescribed time period and then the first circuit switches on the first switch only after the prescribed time period.

2. The DC voltage charging apparatus as claimed in claim 1, wherein the first switch and the second switch are configured as contactors.

3. The DC voltage charging apparatus as claimed in claim 1, wherein:
the precharging circuit is connected in parallel with the first switch.

4. The DC voltage charging apparatus as claimed in claim 3, wherein the first switch is switched on only when a potential difference between the first output and the first input is lower than a prescribed potential difference only after the prescribed time period.

5. The DC voltage charging apparatus as claimed in claim 1, wherein the voltmeter has a measuring resistor and wherein the voltmeter is configured to identify the sign of the voltage value by measuring a voltage drop between the first output and the second output across the measuring resistor.

6. The DC voltage charging apparatus as claimed in claim 1, wherein the charging column has a terminal for a battery that is to be charged.

* * * * *